United States Patent
Lv et al.

(10) Patent No.: US 9,435,457 B2
(45) Date of Patent: Sep. 6, 2016

(54) FLOW REGULATING VALVE

(75) Inventors: Ming Lv, Zhejiang Province (CN); Xianrang Wei, Zhejiang Province (CN); Qingyong Wang, Zhejiang Province (CN)

(73) Assignee: Zhejiang Sanhua Co., Ltd., Zhejiang (CN)

( * ) Notice: Subject to any disclaimer, the term of this patent is extended or adjusted under 35 U.S.C. 154(b) by 188 days.

(21) Appl. No.: 14/124,210

(22) PCT Filed: Jun. 26, 2012

(86) PCT No.: PCT/CN2012/077516
§ 371 (c)(1),
(2), (4) Date: Dec. 5, 2013

(87) PCT Pub. No.: WO2013/000393
PCT Pub. Date: Jan. 3, 2013

(65) Prior Publication Data
US 2014/0097368 A1     Apr. 10, 2014

(30) Foreign Application Priority Data
Jun. 27, 2011     (CN) .......................... 2011 1 0176275

(51) Int. Cl.
*F16K 1/02*     (2006.01)
*F16K 1/48*     (2006.01)
(Continued)

(52) U.S. Cl.
CPC ............ *F16K 31/047* (2013.01); *F16K 31/504* (2013.01); *F16K 31/508* (2013.01); *F16K 31/53* (2013.01); *F25B 41/062* (2013.01); *F25B 2341/0653* (2013.01); *Y02B 30/72* (2013.01)

(58) Field of Classification Search
CPC .. F16K 31/047; F16K 31/508; F25B 41/062; F25B 2341/0653
USPC ............ 137/866, 867; 251/129.11, 215, 264, 251/267
See application file for complete search history.

(56) References Cited

U.S. PATENT DOCUMENTS 1,868,811 A  *  7/1932  Yarnall .......................... 251/270
3,533,598 A     10/1970  Tillman
(Continued)

FOREIGN PATENT DOCUMENTS

CN     85103856 A     5/1987
CN     2703169 Y      6/2005
(Continued)

OTHER PUBLICATIONS

Extended European search report dated Jan. 29, 2015 from corresponding European Application No. 12805233.
(Continued)

*Primary Examiner* — Marina Tietjen
*Assistant Examiner* — Seth W MacKay-Smith
(74) *Attorney, Agent, or Firm* — Wolf, Greenfield & Sacks, P.C.

(57) ABSTRACT

A flow regulating valve includes a valve seat and a shell connected to the valve seat, a motor is provided in the shell, and the motor is connected to a screw rod. The screw rod is connected with a nut in a thread cooperation manner, the nut is connected with a valve rod, and the valve rod is movable in an axial direction to regulate an opening degree of a valve port on the valve seat. The whole of the nut or a lower portion of the nut is in clearance fit with the mounting groove in the valve rod in a radial direction. An internal wall of the mounting groove is provided with an annular position limiting groove, in which a position limiting component is provided. The design of the flow regulating valve is able to eliminate the coaxiality error between the screw rod and the screw nut.

17 Claims, 11 Drawing Sheets

(51) Int. Cl.
*F16K 31/04* (2006.01)
*F16K 31/50* (2006.01)
*F16K 31/53* (2006.01)
*F25B 41/06* (2006.01)

(56) References Cited

U.S. PATENT DOCUMENTS

| | | | | |
|---|---|---|---|---|
| 3,672,393 | A * | 6/1972 | Klassen | 137/307 |
| 3,771,580 | A * | 11/1973 | Branick | 157/1.17 |
| 3,957,245 | A | 5/1976 | Daghe | |
| 4,138,091 | A * | 2/1979 | McGee | 251/267 |
| 4,149,558 | A * | 4/1979 | McGee et al. | 137/315.28 |
| 4,307,745 | A * | 12/1981 | McGee | 137/72 |
| 4,436,279 | A | 3/1984 | Bonds et al. | |
| 4,437,643 | A * | 3/1984 | Brakhage et al. | 251/1.3 |
| 4,541,608 | A * | 9/1985 | Forester et al. | 251/77 |
| 4,593,881 | A * | 6/1986 | Yoshino | 251/124 |
| 4,619,347 | A * | 10/1986 | Schreiner et al. | 188/72.6 |
| 4,658,848 | A * | 4/1987 | Meyer et al. | 137/72 |
| 5,318,064 | A | 6/1994 | Reinicke | |
| 5,364,066 | A * | 11/1994 | Dorste et al. | 251/122 |
| 5,732,731 | A * | 3/1998 | Wafer | 137/312 |
| 5,735,501 | A | 4/1998 | Maurer et al. | |
| 6,145,810 | A * | 11/2000 | Connolly et al. | 251/331 |
| 6,568,656 | B1 | 5/2003 | Wrocklage | |
| 7,240,694 | B2 * | 7/2007 | Johnsen et al. | 137/630.15 |
| 2011/0084224 | A1 | 4/2011 | Zhan et al. | |

FOREIGN PATENT DOCUMENTS

| | | |
|---|---|---|
| CN | 2735101 Y | 10/2005 |
| CN | 2775430 Y | 4/2006 |
| CN | 2823701 Y | 10/2006 |
| CN | 1985118 A | 6/2007 |
| CN | 200580023202.7 | 6/2007 |
| CN | 201013922 Y | 1/2008 |
| CN | 201265694 Y | 7/2009 |
| CN | 101749467 A | 6/2010 |
| CN | 101858455 A | 10/2010 |
| CN | 201706059 U | 1/2011 |
| CN | 102032380 A | 4/2011 |
| CN | 202109047 U | 1/2012 |
| CN | 202149257 U | 2/2012 |
| JP | 8004931 A | 1/1996 |
| JP | 8-303638 A | 11/1996 |
| JP | 2002310541 A | 10/2002 |
| JP | 2009287769 A | 12/2009 |
| KR | 20080098725 A | 11/2008 |
| KR | 100944762 B | 3/2010 |
| SU | 1555583 A1 | 4/1990 |

OTHER PUBLICATIONS

International Search Report dated Oct. 4, 2012 from corresponding International Application No. PCT/CN2012/077516.

International Search Report dated Oct. 4, 2012 from potentially related International Application No. PCT/CN2012/077522.

International Search Report dated Oct. 4, 2012 from potentially related International Application PCT/CN2012/077519.

International Search Report dated Sep. 27, 2012 from potentially related International Application No. PCT/CN2012/077508.

* cited by examiner

FLOW REGULATING VALVE

The present application is the national phase of International Application No. PCT/CN2012/077516, titled "FLOW REGULATING VALVE" and filed on Jun. 26, 2012, which claims the benefit of priority to Chinese patent application No. 201110176275.7, titled "FLOW REGULATING VALVE" and filed with the Chinese State Intellectual Property Office on Jun. 27, 2011, the entire disclosures of which are incorporated herein by reference.

FIELD OF THE INVENTION

The present application relates to the technical field of the fluid control component, in particular, to a flow regulating valve.

BACKGROUND OF THE INVENTION

The flow-adjusting valve is an important component of the refrigeration system, and is another one of four fundamental components of the refrigeration system besides the evaporator, the compressor and the condenser. Operation process of the flow-adjusting valve is generally as follows: with the energizing or de-energizing of the coil device, the valve needle is driven to adjust the opening degree of the valve port, so as to adjust the flow of the refrigerant. Furthermore, the flow regulating valve is widely used in other fluid control fields such as the hydraulic system and the oil transportation fields.

In the prior art, a flow regulating valve is disclosed in Chinese patent application No. 200580023202.7. Referring to FIG. 1 and FIG. 2, FIG. 1 is a structural schematic view of a flow regulating valve in the prior art, and FIG. 2 is a partial enlarged view of the flow regulating valve in FIG. 1.

As shown in FIG. 1, a motor 70 is provided in the motor shell 62, and the lower shell 60 of the motor shell 62 is connected in the head portion 48 in a thread cooperation manner. As shown in FIG. 2, the valve unit 40 includes a discharge piston 130 (equivalent to a nut), and the discharge piston 130 has an internal thread and is configured for housing a driving shaft 78 (equivalent to a screw rod) which has an external thread. The discharge piston 130 is extended a longe length in the axial direction, and is slidably mounted in the sleeve 146 which is mounted in the lower shell 60. The discharge piston 130 is limited by the sleeve 146 and cannot rotate circumferentially. When the motor 70 drives the driving shaft 78 having an external thread to rotate via a gear system, since the discharge piston 130 cannot rotate circumferentially, it can only move axially to thereby drive the valve unit 40 to regulate the opening degree of the valve port on the valve seat 22. However, the flow regulating valve in the prior art has the following drawbacks:

Firstly, the valve unit 40 includes a rear component 94 which is connected in a middle component 96 in a thread cooperation manner. Thereby the axial position of the discharge piston 130 is limited. As shown in FIG. 2, since the discharge piston 130 needs to close or open a small valve port 120b, the discharge piston 130 should not wobble in the radial direction. That is, not gap is formed between the discharge piston 130 and the rear component 94 or the middle component 96 in the radial direction. Otherwise the sealing performance in sealing the small valve port 120b will be affected. The machining and assembling of the components and parts of the valve body may cause a large coaxial error, resulting in a large coaxial error between the driving shaft 78 and the discharge piston 130. Since the discharge piston 130 cannot wobble in the radial direction, the driving shaft is likely to get stuck.

Secondly, the rear component 94 is connected with the middle component 96 through threads, as the discharge piston 130 and the valve unit 40 are moved in the axial direction, the thread cooperation may become loosened, resulting in a low reliability in axially limiting the discharge piston 130.

Thirdly, the discharge piston 130 needs to be fixed in the sleeve 146 of the lower shell 60, such that it is circumferentially limited by the sleeve 146 and thus cannot be rotated. In view of this, the length of the portion of the discharge piston 130 that is protruded out of the valve unit 40 should be sufficient such that it can be extended into the sleeve 146. In this structure configuration, the driving shaft 78 cooperated with the discharge piston 130 also has a large length, therefore the driving shaft 78 has a large deflection, and it is difficult to ensure the coaxial degree between the discharge piston 130 and the driving shaft 78 when assembling the same, and if they are not assembled in proper, the resistance moment will be increased, and moreover, the driving shaft 78 will get stuck.

Fourthly, as is described above, it requires that the discharge piston 130 be protruded out of the valve unit 40 at a sufficient length such that it can be extended into the sleeve 146. Accordingly, the driving shaft 78 and the lower shell 60 have large lengths in the axial direction. Thereby the material cost is increased.

In view of this, there is an urgent demand for the person skilled in the art to make an improvement to the flow regulating valve in the prior art, such that, on the one hand, the coaxial error between the screw rod and the nut, resulting from the machining and assembling of the components and parts, can be eliminated, and on the other hand, the axial position of the nut can be limited more reliably.

SUMMARY OF THE INVENTION

A problem to be solved by the present application is to provide a flow regulating valve, with the structure configuration of the flow regulating valve, on the one hand, the coaxial error between the screw rod and the nut, resulting from the machining and assembling of the components and parts, can be eliminated, and on the other hand, the axial position of the nut can be limited more reliably.

In view of the above, it is provided according to the present application a flow regulating valve which includes a valve seat and a shell connected to the valve seat, among which, a motor is provided in the shell, and the motor is connected to a screw rod via an output shaft of the motor; the screw rod is connected with a nut in a thread cooperation manner; and the nut is connected with a valve rod, and the valve rod is movable in an axial direction to regulate an opening degree of a valve port on the valve seat; and wherein the valve rod is provided therein with an mounting groove, and the whole of the nut or a lower portion of the nut is in clearance fit with the mounting groove in a radial direction; and an internal wall of the mounting groove is provided with an annular position limiting groove, and a position limiting component that limits an axial position of the nut and in clearance fit with an exterior portion of the nut is provided in the annular position limiting groove.

Preferably, the position limiting component includes a snap ring, and a circumferential side wall of the nut is provided with a position limiting step surface. The snap ring is mounted in the annular position limiting groove and is supported on the position limiting step surface, and there is a gap between the internal wall of the snap ring and a corresponding side wall of the nut.

Preferably, the position limiting component further includes a check ring which is sleeved and supported on the position limiting step surface in a circumferential direction, and there is a gap between an internal wall of the check ring and a corresponding side wall of the nut; and the snap ring is supported on the position limiting step surface via the check ring.

Preferably, a top surface of the check ring is provided with a check ring step surface, the snap ring is supported on the check ring step surface, and there is a gap between an internal wall of the snap ring and a corresponding side wall of the check ring.

Preferably, the position limiting step surface is a first tapered surface, a bottom surface of the check ring is a second tapered surface, and an inclined angle of the first tapered surface is less than that of the second tapered surface.

Preferably, one of a bottom wall of the mounting groove and a bottom wall of the nut is provided with a circumferential position limiting groove, the other one is provided with a position limiting projection, and the position limiting projection is provided in the circumferential position limiting groove.

Preferably, the valve rod includes an injection molded body and a metal housing wrapping the injection molded body, an inner cavity of an upper portion of the injection molded body forms the mounting groove, and the annular position limiting groove is provided on an internal wall of the injection molded body.

Preferably, the valve rod includes an injection molded body and a metal housing wrapping the injection molded body. An inner side of a top end portion of the metal housing is provided with a metal projection, an inner cavity of an upper portion of the injection molded body and an inner cavity of the metal projection form the mounting groove, and the annular position limiting groove is provided on an inner wall of the metal projection.

Preferably, the whole of the nut is provided in the mounting groove; the output shaft of the motor is connected with the screw rod via a gear system, the gear system is supported on the gear seat which is located in a valve cavity of the valve seat, and the screw rod is passed through the gear seat and is in thread cooperation with the nut; and a lower portion of the gear seat is provided with a first position limiting portion, and an upper portion of the valve rod is provided with a second position limiting portion which is cooperated with the first position limiting portion such that the position of the valve rod relative to the gear seat is circumferentially limited and the valve rod is slidable in the axial direction.

Preferably, the first position limiting portion is a noncircular special-shaped cavity, and the second position limiting portion is a noncircular special-shaped portion which is slidable in the axial direction and is provided in the noncircular special-shaped cavity.

Preferably, the gear seat is provided with a plurality of first locating rod members extended in an axial direction, and the first position limiting portion is the first locating rod member; among the first locating rod members, at least one group of adjacent first locating rod members form a position limiting gap; and the second position limiting portion is a second locating rod member provided on a side wall of the valve rod, an upper portion of the valve rod is extended into a space surrounded by the first locating rod members in the circumferential direction, and the second locating rod member is inserted in the position limiting gap.

On the basis of the prior art, the valve rod of the flow regulating valve according to the present application is provided therein with an mounting groove, and the whole of the nut or the lower portion of the nut is in clearance fit with the mounting groove in the radial gap. The inner wall of the mounting groove is provided with an annular position limiting groove, and a position limiting component that limits the axial position of the nut and in clearance fit with the exterior portion of the nut is provided in the annular position limiting groove. In the present application, since the whole of the nut or the lower portion of the nut is in clearance fit with the mounting groove in the radial direction, and the position limiting component is in clearance fit with the nut in the radial direction, after being assembled, the nut may be driven under the action of the screw rod to wobble radially in a small gap in the valve rod. Thus the coaxial error between the screw rod and the nut, resulting from the machining and assembling of the components and parts, can be eliminated, and the phenomenon in which the screw rod gets stuck can further be avoided.

Furthermore, in the present application, since the internal wall of the mounting groove is provided with an annular position limiting groove, a position limiting component is mounted in the annular position limiting groove, and the nut is axially limited through the position limiting component, this kind of position limiting structure can avoid the loosening problem of the thread cooperation connection manner, and thus the reliability of the structure in limiting the axial position of the nut is improved.

Above all, with the flow regulating valve according to the present application, on the one hand, the coaxial error between the screw rod and the nut, resulting from the machining and assembling of the components and parts, can be eliminated, and on the other hand, the axial position of the nut can be limited more reliably.

BRIEF DESCRIPTION OF THE DRAWINGS

FIG. 4-1 is a sectional view of the valve rod in FIG. 4;

FIG. 4-2 is an exploded view of the valve rod in FIG. 4-1;

FIG. 4-3 is a partial enlarged view of part A of the valve rod in FIG. 4-1;

FIG. 4-4 is an assembling schematic view of a check ring and a nut of the valve rod in FIG. 4-1;

FIG. 5-1 is a sectional view of the valve rod in FIG. 5;

FIG. 5-2 is an exploded view of the valve rod in FIG. 5;

FIG. 5-3 is a partial enlarged view of part B of the valve rod in FIG. 5-1;

Figure 1:
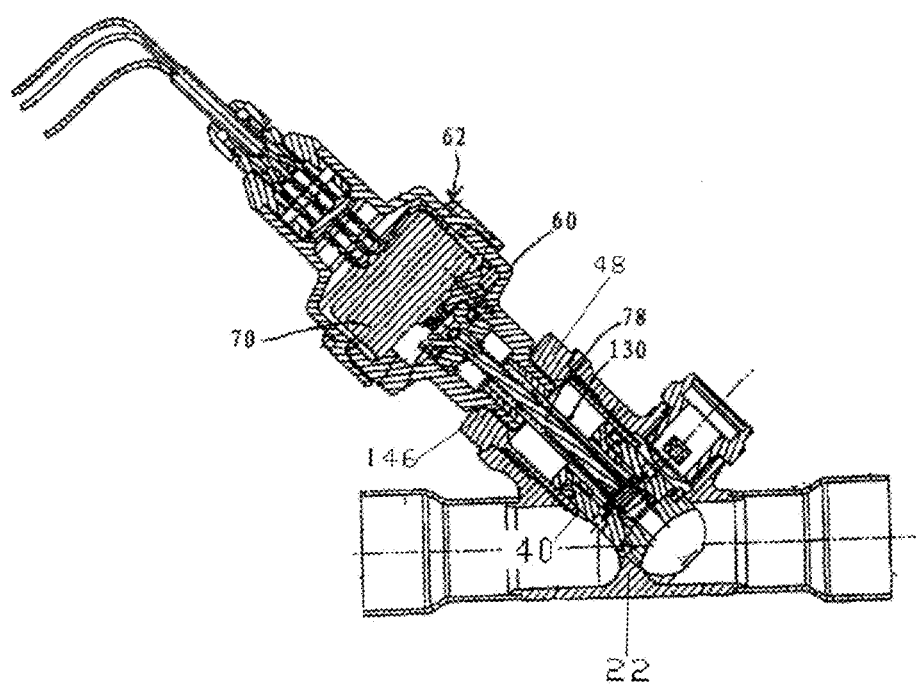
FIG. 1 is a structural schematic view of a flow regulating valve in the prior art.
Figure 2:
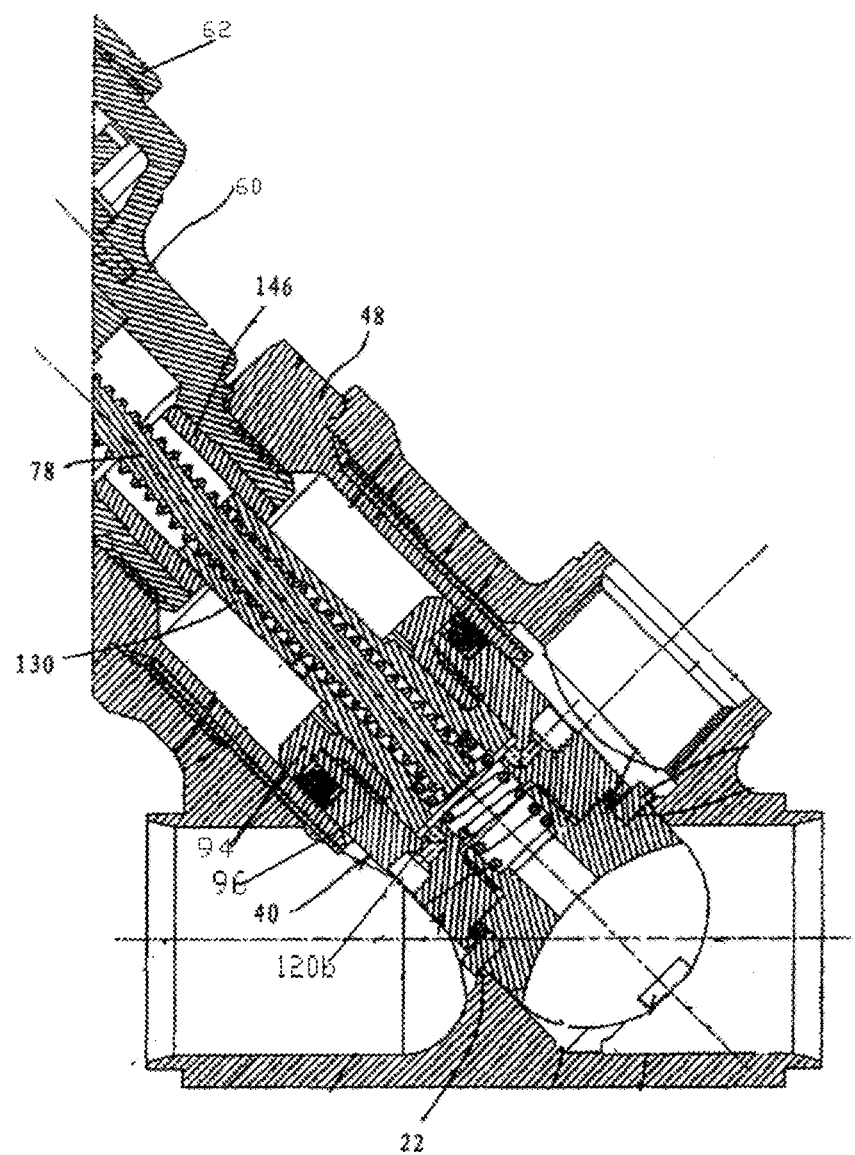
FIG. 2 is a partial enlarged view of the flow regulating valve in FIG. 1.

Corresponding relationships among the reference numbers and the component in FIG. 1 and FIG. 2 are as follows:

62 motor shell; 70 motor; 48 head portion; 40 valve unit; 130 discharge piston; 78 driving shaft; 146 sleeve; 60 lower shell; 22 valve seat; 94 rear component; 96 middle component; 120b small valve port.

Corresponding relationships among the reference numbers and the component in FIG. 3 to FIG. 7 are as follows:
- 1 valve seat; 11 upper valve seat; 12 lower valve seat; 13 sleeve;
- 2 shell; 21 motor; 22 gear system;
- 3 screw rod;
- 4 nut; 41 position limiting step surface; 42 position limiting projection;
- 5 valve rod; 51 mounting groove; 52 annular position limiting groove; 53 position limiting component; 531 snap ring; 532 check ring; 532a check ring step surface; 532b second tapered surface; 54 circumferential position limiting groove; 55 injection molded body; 56 metal housing; 56a metal projection; 57 noncircular special-shaped portion; 58 second locating rod member;
- 6 gear seat; 61 noncircular special-shaped cavity; 62 first locating rod member; 63 position limiting gap.

DETAILED DESCRIPTION OF THE INVENTION

A spirit of the present application is to provide a flow regulating valve, with the structure configuration of the flow regulating valve, on the one hand, the coaxial error between the screw rod and the nut, resulting from the machining and assembling of the components and parts, can be eliminated, and on the other hand, the axial position of the nut can be limited more reliably.

In order that those skilled in the art can better understand technical solutions of the present application, the present application is described in detail hereinafter in conjunction with the accompanying drawings and the embodiments.

Figure 3:
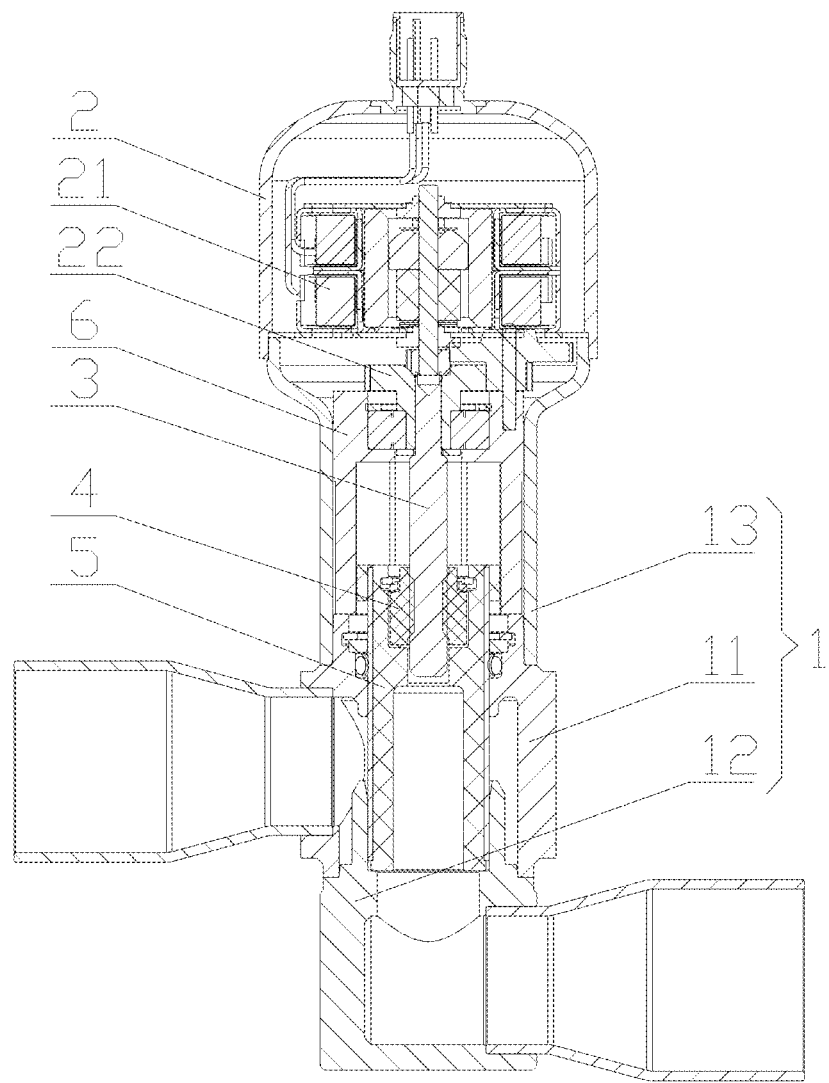
FIG. 3 is a structural schematic view of a flow regulating valve in a first embodiment of the present application.
Figure 4:
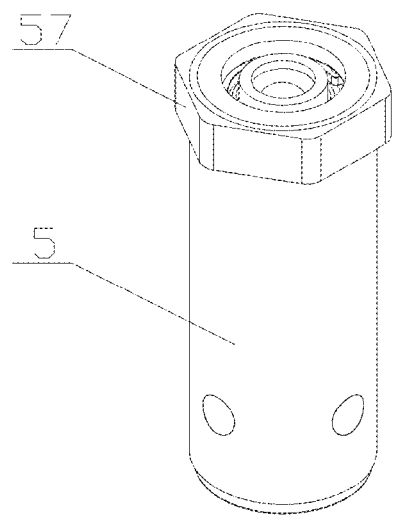
FIG. 4 is a structural schematic view of a valve rod of the flow regulating valve in FIG. 3.
Figures 1, 4:
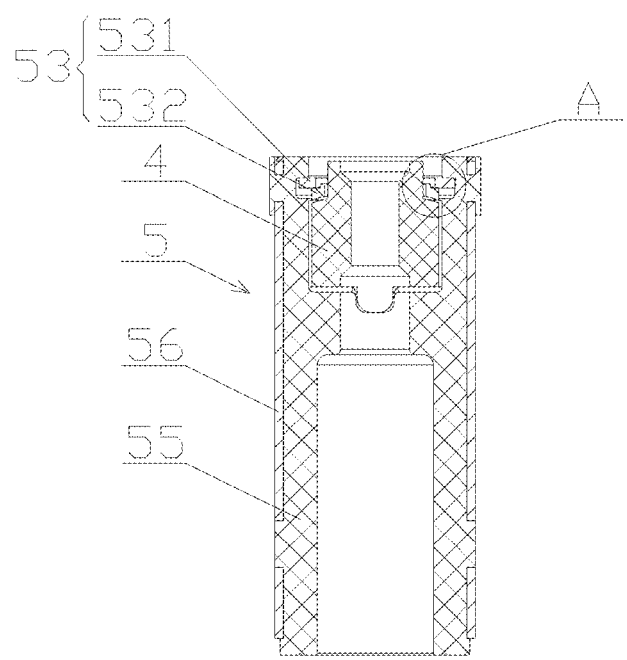
Figures 2, 4:
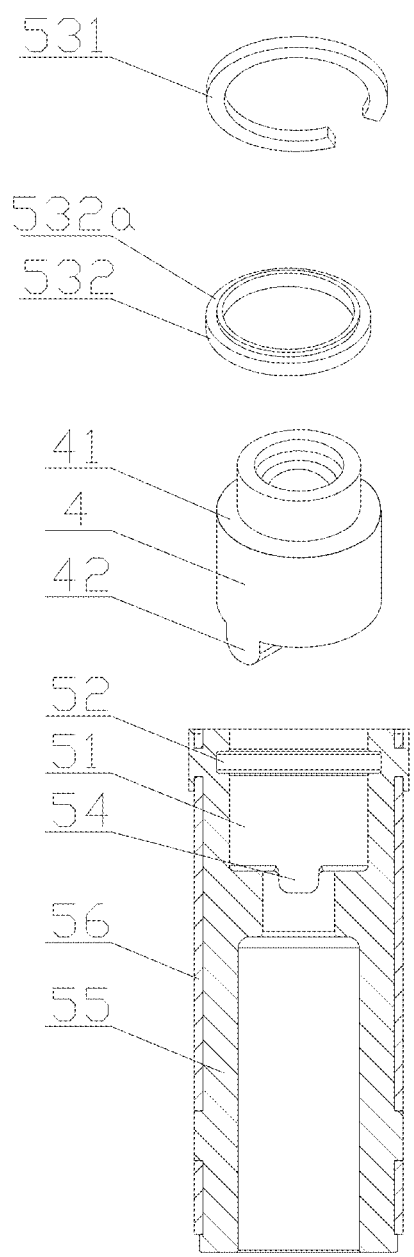
Figures 3, 4:
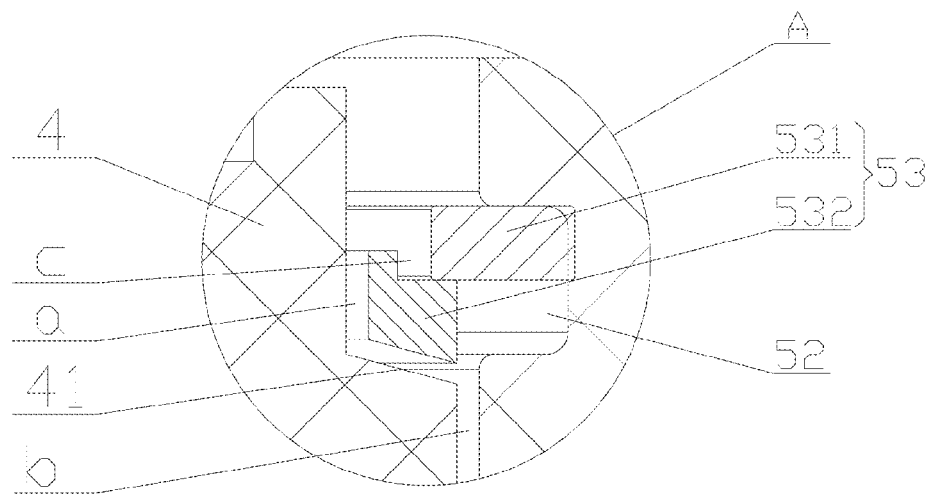
Figure 4:
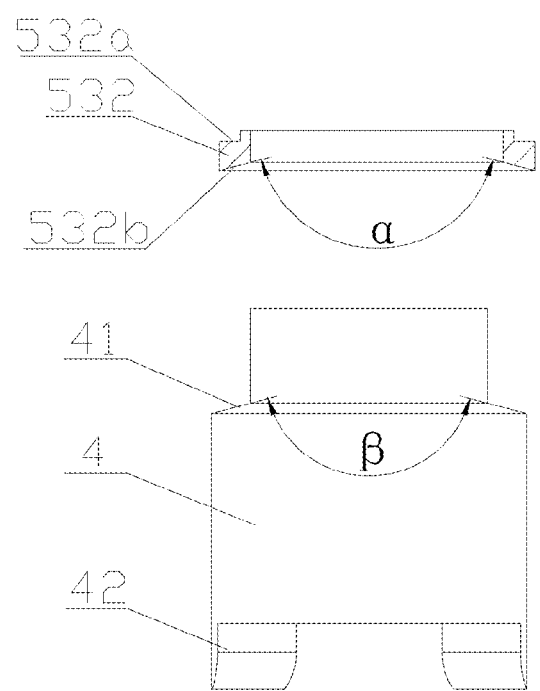

Preferring to FIG. 3 to FIG. 4-4, FIG. 3 is a structural schematic view of a flow regulating valve according to a first embodiment of the present application; FIG. 4 is a structural schematic view of a valve rod of the flow regulating valve in FIG. 3; FIG. 4-1 is a sectional view of the valve rod in FIG. 4; FIG. 4-2 is an exploded view of the valve rod in FIG. 4-1; FIG. 4-3 is a partial enlarged view of part A of the valve rod in FIG. 4-1; and FIG. 4-4 is an assembling schematic view of a check ring and a nut of the valve rod in FIG. 4-1.

In the basic technical solution, the flow regulating valve according to the present application includes a valve seat 1 and a shell 2 connected to the valve seat 1. A motor 21 is provided in the shell 2, and an output shaft of the motor 21 is in transmission connection with the screw rod 3 via the gear system 22 supported on the gear seat 6, thus the screw rod 3 is rotated with the output shaft of the motor 21. The screw rod 3 is connected with the nut 4 in a thread cooperation manner, and the nut 4 is connected to the valve rod 5. As the output shaft of the motor 21 is rotated, the screw rod 3 is rotated, and then the screw rod 3 drives the valve rod 5 to move in the axial direction. Thereby the valve rod regulates the opening degree of the valve port on the valve seat 1.

On basis of the above structure, referring to FIG. 4-1 to FIG. 4-2, the valve rod 5 is provided therein with a mounting groove 51, and the whole of the nut 4 or a lower portion of the nut 4 is in clearance fit with the mounting groove 51 in a radial direction. The internal wall of the mounting groove 51 is provided with an annular position limiting groove 52, and a position limiting component 53 that limits the axial position of the nut 4 and in clearance fit with the exterior portion of the nut 4 is provided in the annular position limiting groove 52.

In the present application, since the whole of the nut 4 or the lower portion of the nut 4 is in clearance fit with the mounting groove 51 in the radial direction, and the position limiting component 53 is in clearance fit with the nut 4 in the radial direction, after being assembled, the nut 4 may be driven under the action of the screw rod 3 to wobble radially in a small gap in the valve rod 5. Thus the coaxial error between the screw rod 3 and the nut 4, resulting from the machining and assembling of the components and parts, can be eliminated, and the phenomenon in which the screw rod gets stuck can further be avoided.

Furthermore, in the present application, since the internal wall of the mounting groove 51 is provided with an annular position limiting groove 52, and a position limiting component 53 is mounted in the annular position limiting groove 52, the nut 4 is axially limited through the position limiting component 53, therefore this kind of position limiting structure can avoid the loosening problem of the thread cooperation connection manner, and thus the reliability of the structure in limiting the axial position of the nut 4 is improved.

It is to be noted that, the emphasis of the above basic technical solution lies in how to connect the nut 4 to the valve rod 5, but not in whether the nut 4 is integrally provided in the valve rod 5. Thus, as long as the connection structure between the nut 4 and the valve rod 5 in the present application is employed, regardless of whether the nut 4 is integrally provided in the mounting groove 51 of the valve rod 5 as shown in FIG. 4-1, or only the lower portion of the discharge piston 130 (corresponding to the nut 4 in the present application) is provided in the valve unit 40 (corresponding to the valve rod 5 in the present application), it should fall within the protection scope of the present application.

Furthermore, it is to be noted that, as shown in FIG. 3, the valve seat 1 may have a split structure, including an upper valve seat 11, a lower valve seat 12 and a sleeve 13. However, in the present application, the structure of the valve seat 1 is not limited, the valve seat 1 may be an integral member, that is, the upper valve seat 11, the lower valve seat 12 and the sleeve 13 may be made into one piece. Alternatively, the upper valve seat 11 and the lower valve seat 12 may be made into one piece, and then forms together with the sleeve 13 into the valve seat 1, which is not limited in the present application.

In the above basic technical solution, the structure of the position limiting component 53 may be configured in detail. For example, as shown in FIG. 4-1, FIG. 4-2 and FIG. 4-3, the position limiting component 53 includes a snap ring 531, the circumferential side wall of the nut 4 is provided with a position limiting step surface 41, and the snap ring 531 is mounted in the annular position limiting groove 52 and is supported on the position limiting step surface 41. There is a gap between the internal wall of the snap ring 531 and the corresponding side wall of the nut 4. As shown in FIG. 4-2, the snap ring 531 is opened such that it can become contracted when suffering a force, and thus it can be conveniently mounted in the annular position limiting groove 52, and after being mounted in the annular position limiting groove 52, the snap ring 531 can restore to its original shape, to thereby be further mounted and supported on the position limiting step surface 41, which structure configuration can limit the axial position of the nut 4 conveniently, and has a simple structure and a low cost.

Further, as shown in FIG. 4-1, FIG. 4-2 and FIG. 4-3, the position limiting component 53 may further include a check ring 532. The check ring 532 is mounted and supported on the position limiting step surface 41 in the circumferential direction, and there is a gap between the internal wall of the check ring and the corresponding side wall of the nut 4; and the snap ring 531 is supported on the position limiting step surface 41 via the check ring 532. With the cooperative actions of the snap ring 531 and the check ring 532, the reliability of the structure configuration in limiting the axial position of the nut 4 can be further improved.

Furthermore, as shown in FIG. 4-3, there is a gap between the internal wall of the check ring 532 and the corresponding side wall of the nut 4, meanwhile there is a gap b between the internal wall of the mounting groove 51 and the corresponding side wall of the nut 4, the concurrence of the two gaps can make the nut 4 radially wobble in the mounting groove 51 in a small gap. Furthermore, as shown in FIG. 4-3, there is a gap c between the internal wall of the snap ring 531 and the side wall of the corresponding check ring 532, and with the gap c, the snap ring 531 can be conveniently mounted in the annular position limiting groove 52.

Above all, with the structure configuration of the snap ring 531 and the check ring 532, on the one hand, the nut 4 can be conveniently wobbled in the radial direction in a small gap, and on the other hand, the reliability of limiting the axial position of the nut 4 can be further improved.

Furthermore, as shown in FIG. 4-4, the position limiting step surface 41 is a first tapered surface, and the bottom surface of the check ring 532 is a second tapered surface 532b; and, as shown in FIG. 4-4, the inclined angle β of the first tapered surface is less than the inclined angle α of the second tapered surface 532b. Since the inclined angle β of the first tapered surface is less than the inclined angle α of the second tapered surface 532b, when the first tapered surface is contacted with the second tapered surface 532b, the contact between them is a line contact, rather than a surface contact, therefore the contact area is small and the friction force between the first tapered surface and the second tapered surface 532b is small. Thereby the resistance restraining the nut 4 from wobbling radially can be greatly decreased.

Furthermore, further improvements may be made in the above basic technical solution. Specifically, as shown in FIG. 4-2, the bottom wall of the mounting groove 51 is provided with a circumferential position limiting groove 54, and the bottom wall of the nut 4 is provided with a position limiting projection 42. As shown in FIG. 4-1, the position limiting projection 42 is provided in the circumferential position limiting groove 54, with which structure configuration, the circumferential rotation of the nut 4 relative to the valve rod 5 can be limited, and the structure is simple and the processing is low-cost. Alternatively, the bottom wall of the mounting groove 51 may be provided with a position limiting projection 42, and the bottom wall of the nut 4 may be provided with a circumferential position limiting groove 54, and it is apparent that this kind of structure can also achieve the above technical effect.

Further improvements may be made on the basis of the above basic technical solution to thereby obtain the first embodiment according to the present application. Specifically, in the first embodiment, as shown in FIG. 4-1 and FIG. 4-2, the valve rod 5 includes an injection molded body 55 and a metal housing 56 wrapping the injection molded body 55. The inner cavity of the upper portion of the injection molded body 55 forms the mounting groove 51, and the annular position limiting groove 52 is provided on the internal wall of the injection molded body 55. The formation manner and machining process of the annular position limiting groove 52 are simple, and the processing cost is low.

Figure 5:
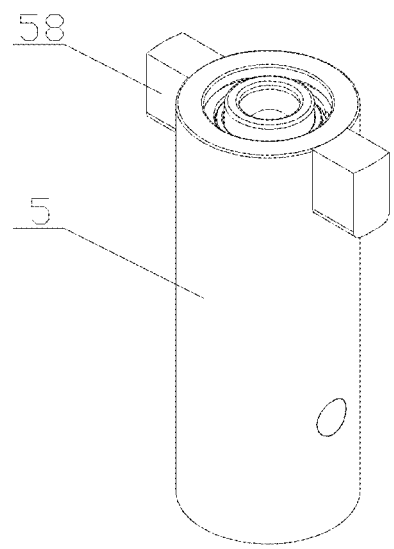
FIG. 5 is a structural schematic view of a valve rod in a second embodiment of the present application.
Figures 1, 5:
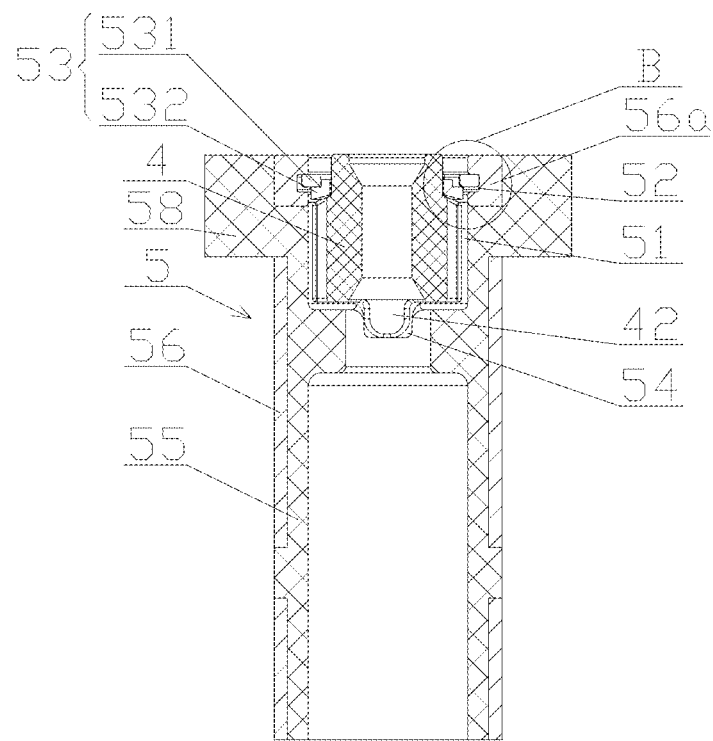
Figures 2, 5:
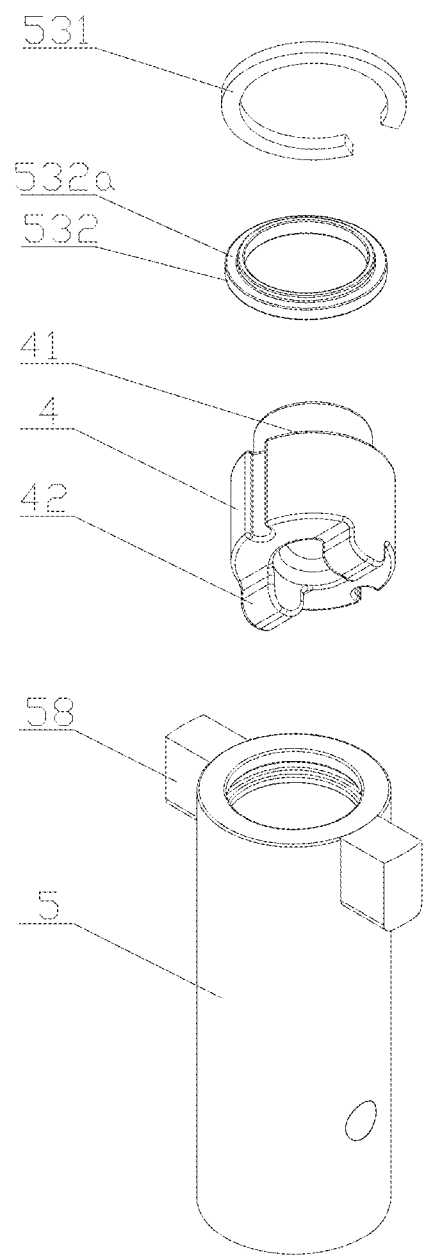
Figures 3, 5:
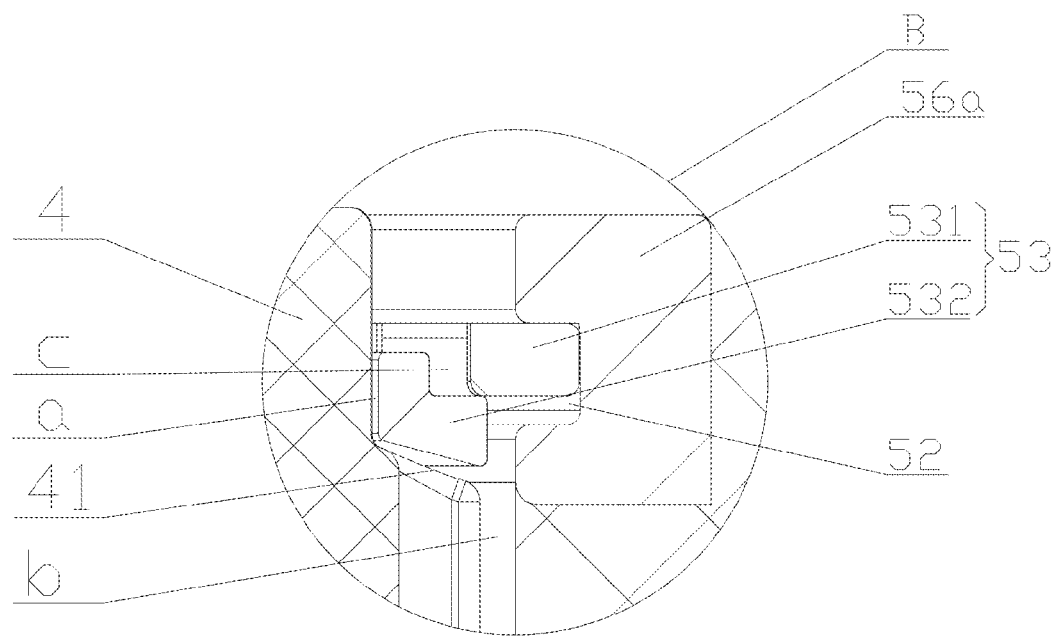

Furthermore, further improvements may be made on the basis of the above basic technical solution to thereby obtain the second embodiment according to the present application. Specifically, referring to FIG. 5 to FIG. 5-3, FIG. 5 is a structural schematic view of a valve rod in the second embodiment of the present application; FIG. 5-1 is a sectional view of the valve rod in FIG. 5; FIG. 5-2 is an exploded view of the valve rod in FIG. 5; and FIG. 5-3 is a partial enlarged view of part B of the valve rod in FIG. 5-1.

It is to be noted that, the structure configuration of the valve rod 5 in the second embodiment according to the present application is substantially the same as that in the first embodiment according to the present application, and the differences are that: in the second embodiment, as shown in FIG. 5-1 to FIG. 5-3, the inner side of the top end portion of the metal housing 56 is provided with a metal projection 56a; the inner cavity of the upper portion of the injection molded body 55 and the inner cavity of the metal projection 56a form the mounting grooves 51, and the annular position limiting groove 52 is provided on the inner wall of the metal projection 56a.

In the first embodiment described above, since the annular position limiting groove 52 is provided on the injection molded body 55, the injection molded body 55 is formed in the metal housing 56, and then the valve rod 5 is clamped to machine the annular position limiting groove 52. If the valve rod 5 is clamped during the machining operation, the sealing surface formed by the portion of the injection molded body 55 at the lower end of the valve rod 5 will be affected, which thereby will influence the sealing performance of the valve rod 5.

While in the second embodiment, since the metal housing 56 is machine-shaped before the injection molding, that is, the metal projection 56a is provided with the annular position limiting groove 52 before the injection molded body 55 being formed in the metal housing 56, after the injection molded body 55 is formed, there is no need to clamp the valve rod 5 to machine the annular position limiting groove 52, thus the influence of the clamping on the sealing surface formed by the portion of the injection molded body 55 at the lower end of the valve rod 5 can be avoided, which thus can ensure that the sealing performance of the valve rod 5 will not be influenced.

Figure 6:
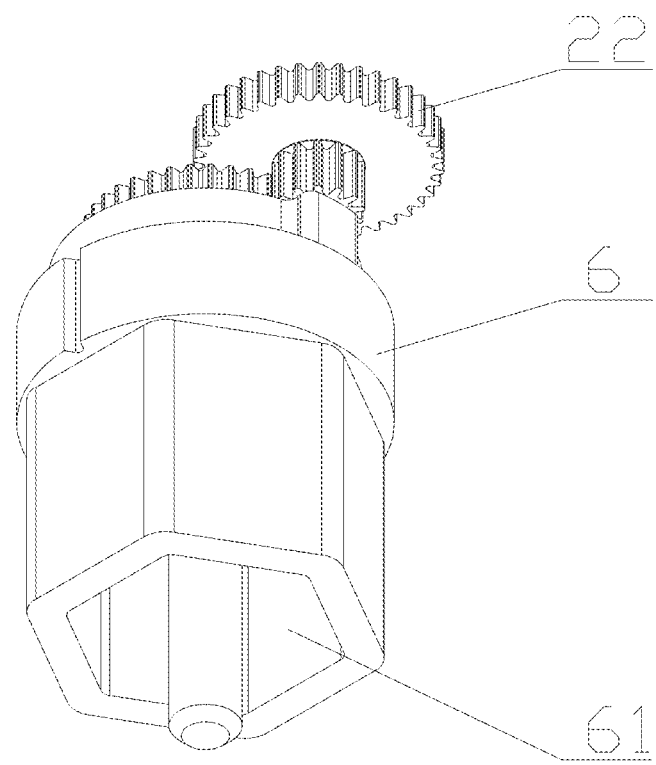
FIG. 6 is a structural schematic view of a gear seat cooperated with the valve rod in FIG. 4.
Figure 7:
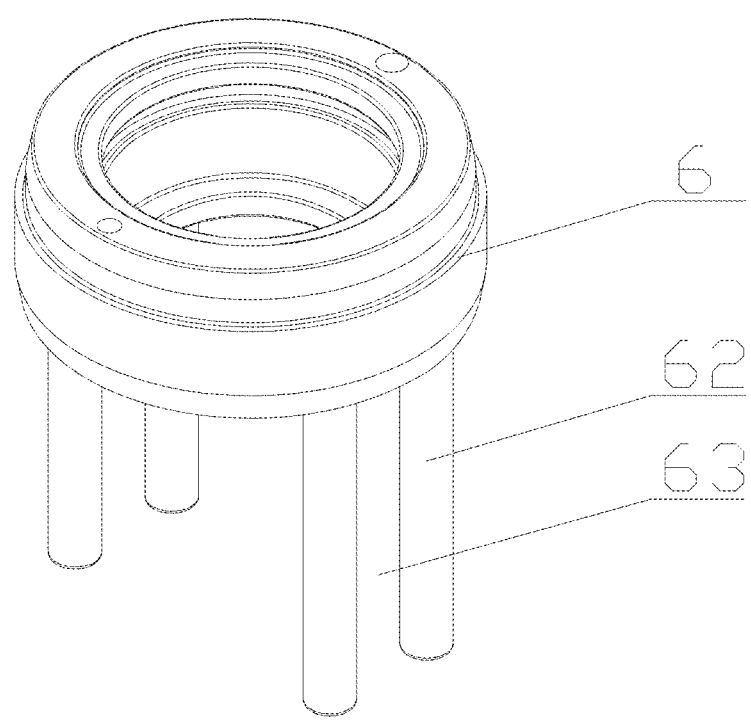
FIG. 7 is a structural schematic view of a gear seat cooperated with the valve rod in FIG. 5.

Further improvements may be made on the basis of any of the above basic technical solutions. For example, referring to FIG. 4, FIG. 5, FIG. 6 and FIG. 7, FIG. 6 is a structural schematic view of a gear seat cooperated with the valve rod in FIG. 4; and FIG. 7 is a structural schematic view of a gear seat cooperated with the valve rod in FIG. 5.

A lower portion of the gear seat 6 may be provided with a first position limiting portion, and an upper portion of the valve rod 5 may be provided with a second position limiting portion which is cooperated with the first position limiting portion, such that the position of the valve rod 5 relative to the gear seat 6 is limited in the circumferential direction and the valve rod 5 is slidable in the axial direction. Based on this arrangement, the nut 4 can be wholly provided in the mounting groove 51 of the valve rod 5, and the nut 4 is limited both in the axial and circumferential directions and is connected in the mounting groove 51.

Since the whole of the valve rod 5 is circumferentially limited relative to the gear seat 6 and is slidable in the axial direction, and the nut 4 is limited both in the axial and circumferential directions and is connected in the mounting groove 51 of the valve rod 1, as the screw rod 3 is rotated, the nut 4 drives the valve rod 5 to slide in the axial direction, thereby the opening degree of the valve port is adjusted by the valve rod 5.

As shown in FIG. 1 and FIG. 2, the discharge piston 130 needs to be fixed in the sleeve 146 of the lower shell 60, since the discharge piston is limited by the sleeve 146 and thus cannot rotate circumferentially, it requires that the discharge piston 130 be protruded out of the valve unit 40 at a sufficient length such that it can be extended into the sleeve 146. In this structure configuration, the driving shaft 78 cooperated with the discharge piston 130 also has a large length, therefore the driving shaft 78 has a large deflection, and it is difficult to ensure the coaxial degree between the discharge piston 130 and the driving shaft 78 when assembling the same, and if they are assembled slantingly, the resistance moment will be increased, and moreover, the driving shaft 78 will get stuck.

While in the present application, instead of limiting the circumferential position of the nut 4 directly, the circumferential position of the whole valve rod 5 is directly limited by the gear seat 6, and the nut 4 is limited both in the axial and circumferential directions and is connected in the mounting groove 51 of the valve rod 1, therefore the nut 4 needs not to be protruded out of the valve rod 5, and the nut 4 can be provided within the valve rod 5. Thus the axial length of the nut 5 can be greatly decreased, and thus the length of the screw rod 3 can be greatly decreased and the deflection thereof can be decreased. Thereby it is easy to ensure the coaxial degree error when assembling the screw rod 3 and the nut 4, which in turn can prevent the screw rod 3 from getting stuck.

In the above basic technical solutions, structures of the first position limiting portion and the second position limiting portion may be configured in detail. For example, as shown in FIG. 6, the first position limiting portion is a noncircular special-shaped cavity 61; and as shown in FIG. 4, the second position limiting portion is a noncircular special-shaped portion 57 which is slidable in the axial direction and is provided in the noncircular special-shaped cavity 61. The above structure conveniently achieves the object that the valve rod 5 is limited and fixed in the circumferential direction relative to the gear seat 6 and is slidable in axial direction.

It is to be noted that, as shown in FIG. 4 and FIG. 6, each of the noncircular special-shaped cavity 61 and the noncircular special-shaped portion 57 has a hexagonal shape, but their shapes are not limited herein, any noncircular shape that can limit the valve rod 5 such that it cannot be rotated relative to the gear seat 6 should fall within the protection scope of the present application.

As shown in FIG. 7, the gear seat 6 is provided with a plurality of first locating rod members 62 extended in the axial direction, and the first position limiting portion is the first locating rod member 62. In the first locating rod members 62, the gap between at least one group of adjacent first locating rod members 62 form a position limiting gap 63. Specifically, as shown in FIG. 7, the gear seat 6 may be provided with four first locating rod members, and two position limiting gaps 63 are formed by the four first locating rod members. As shown in FIG. 5, the second position limiting portion is the second locating rod member 58 provided on the side wall of the valve rod 5, and on the basis of this arrangement, the upper portion of the valve rod 5 is extended into the space surrounded by the first locating rod members 62 in the circumferential direction, and the second locating rod member 58 is inserted into the position limiting gap 63. Apparently, with this structure configuration, the valve rod 5 can also be limited and fixed in the circumferential direction relative to the gear seat 6 and is also slidable in the axial direction. Meanwhile the gear seat 6 is merely provided with several first locating rod members 62, and thus the material cost of the gear seat 6 can be greatly decreased.

The flow regulating valve according to the present application is introduced in detail through the above description. Specific examples are employed to describe the principle and embodiments of the present application. The description of the above embodiments is only provided for the understanding of the method of the present application and the core idea thereof. It should be noted that, those skilled in the art may make many modifications and improvements to the present application without departing from the principle of the present application, and all these modifications and improvements should fall within the protection scope of the claims of the present application.

The invention claimed is:

1. A flow regulating valve, comprising: a valve seat and a shell connected to the valve seat, wherein a motor is provided in the shell, and the motor is connected to a screw rod via an output shaft of the motor; the screw rod is connected with a nut in a thread cooperation manner; and the nut is connected with a valve rod, and the valve rod is movable in an axial direction to regulate an opening degree of a valve port on the valve seat; and wherein the valve rod is provided therein with a mounting groove, and the whole of the nut or a lower portion of the nut is in clearance fit with the mounting groove in a radial direction; and an internal wall of the mounting groove is provided with an annular position limiting groove, and a position limiting component that limits an axial position of the nut and in clearance fit with an exterior portion of the nut is provided in the annular position limiting groove; and one of a bottom wall of the mounting groove and a bottom wall of the nut is provided with a circumferential position limiting groove, the other one is provided with a position limiting projection, and the position limiting projection is provided in the circumferential position limiting groove.

2. The flow regulating valve according to claim 1, wherein the position limiting component comprises a snap ring, and a circumferential side wall of the nut is provided with a position limiting step surface, and wherein the snap ring is mounted in the annular position limiting groove and is supported on the position limiting step surface, and there is a gap between the internal wall of the snap ring and a corresponding side wall of the nut.

3. The flow regulating valve according to claim 2, wherein the position limiting component further comprises a check ring which is sleeved and supported on the position limiting step surface in a circumferential direction, and there is a gap between an internal wall of the check ring and a corresponding side wall of the nut; and the snap ring is supported on the position limiting step surface via the check ring.

4. The flow regulating valve according to claim 3, wherein a top surface of the check ring is provided with a check ring step surface, the snap ring is supported on the check ring step surface, and there is a gap between an internal wall of the snap ring and a corresponding side wall of the check ring.

5. The flow regulating valve according to claim 4, wherein the whole of the nut is provided in the mounting groove; the output shaft of the motor is connected with the screw rod via a gear system, the gear system is supported on the gear seat which is located in a valve cavity of the valve seat, and the screw rod is passed through the gear seat and is in thread cooperation with the nut; and a lower portion of the gear seat is provided with a first position limiting portion, and an upper portion of the valve rod is provided with a second position limiting portion which is cooperated with the first position limiting portion such that the position of the valve rod relative to the gear seat is circumferentially limited and the valve rod is slidable in the axial direction.

6. The flow regulating valve according to claim 3, wherein the position limiting step surface is a first tapered surface, a bottom surface of the check ring is a second tapered surface, and an inclined angle of the first tapered surface is less than that of the second tapered surface.

7. The flow regulating valve according to claim 6, wherein the whole of the nut is provided in the mounting groove; the output shaft of the motor is connected with the screw rod via a gear system, the gear system is supported on the gear seat which is located in a valve cavity of the valve seat, and the screw rod is passed through the gear seat and is in thread cooperation with the nut; and a lower portion of the gear seat is provided with a first position limiting portion, and an upper portion of the valve rod is provided with a second position limiting portion which is cooperated with the first position limiting portion such that the position of the valve rod relative to the gear seat is circumferentially limited and the valve rod is slidable in the axial direction.

8. The flow regulating valve according to claim 3, wherein the whole of the nut is provided in the mounting groove; the output shaft of the motor is connected with the screw rod via a gear system, the gear system is supported on the gear seat which is located in a valve cavity of the valve seat, and the screw rod is passed through the gear seat and is in thread cooperation with the nut; and a lower portion of the gear seat is provided with a first position limiting portion, and an upper portion of the valve rod is provided with a second position limiting portion which is cooperated with the first position limiting portion such that the position of the valve rod relative to the gear seat is circumferentially limited and the valve rod is slidable in the axial direction.

9. The flow regulating valve according to claim 2, wherein the whole of the nut is provided in the mounting groove; the output shaft of the motor is connected with the screw rod via a gear system, the gear system is supported on the gear seat which is located in a valve cavity of the valve seat, and the screw rod is passed through the gear seat and is in thread cooperation with the nut; and a lower portion of the gear seat is provided with a first position limiting portion, and an upper portion of the valve rod is provided with a second position limiting portion which is cooperated with the first position limiting portion such that the position of the valve rod relative to the gear seat is circumferentially limited and the valve rod is slidable in the axial direction.

10. The flow regulating valve according to claim 1, wherein the valve rod comprises an injection molded body and a metal housing wrapping the injection molded body, an inner cavity of an upper portion of the injection molded body forms the mounting groove, and the annular position limiting groove is provided on an internal wall of the injection molded body.

11. The flow regulating valve according to claim 10, wherein the whole of the nut is provided in the mounting groove; the output shaft of the motor is connected with the screw rod via a gear system, the gear system is supported on the gear seat which is located in a valve cavity of the valve seat, and the screw rod is passed through the gear seat and is in thread cooperation with the nut; and a lower portion of the gear seat is provided with a first position limiting portion, and an upper portion of the valve rod is provided with a second position limiting portion which is cooperated with the first position limiting portion such that the position of the valve rod relative to the gear seat is circumferentially limited and the valve rod is slidable in the axial direction.

12. The flow regulating valve according to claim 1, wherein the valve rod comprises an injection molded body and a metal housing wrapping the injection molded body, wherein an inner side of a top end portion of the metal housing is provided with a metal projection, an inner cavity of an upper portion of the injection molded body and an inner cavity of the metal projection form the mounting groove, and the annular position limiting groove is provided on an inner wall of the metal projection.

13. The flow regulating valve according to claim 12, wherein the whole of the nut is provided in the mounting groove; the output shaft of the motor is connected with the screw rod via a gear system, the gear system is supported on the gear seat which is located in a valve cavity of the valve seat, and the screw rod is passed through the gear seat and is in thread cooperation with the nut; and a lower portion of the gear seat is provided with a first position limiting portion, and an upper portion of the valve rod is provided with a second position limiting portion which is cooperated with the first position limiting portion such that the position of the valve rod relative to the gear seat is circumferentially limited and the valve rod is slidable in the axial direction.

14. The flow regulating valve according to claim 1, wherein the whole of the nut is provided in the mounting groove; the output shaft of the motor is connected with the screw rod via a gear system, the gear system is supported on the gear seat which is located in a valve cavity of the valve seat, and the screw rod is passed through the gear seat and is in thread cooperation with the nut; and a lower portion of the gear seat is provided with a first position limiting portion, and an upper portion of the valve rod is provided with a second position limiting portion which is cooperated with the first position limiting portion such that the position of the valve rod relative to the gear seat is circumferentially limited and the valve rod is slidable in the axial direction.

15. The flow regulating valve according to claim 14, wherein the first position limiting portion is a noncircular special-shaped cavity, and the second position limiting portion is a noncircular special-shaped portion which is slidable in the axial direction and is provided in the noncircular special-shaped cavity.

16. The flow regulating valve according to claim 14, wherein the gear seat is provided with a plurality of first locating rod members extended in an axial direction, and the first position limiting portion is the first locating rod member; among the first locating rod members, at least one group of adjacent first locating rod members form a position limiting gap; and the second position limiting portion is a second locating rod member provided on a side wall of the valve rod, an upper portion of the valve rod is extended into a space surrounded by the first locating rod members in the circumferential direction, and the second locating rod member is inserted in the position limiting gap.

17. The flow regulating valve according to claim 1, wherein the whole of the nut is provided in the mounting groove; the output shaft of the motor is connected with the screw rod via a gear system, the gear system is supported on the gear seat which is located in a valve cavity of the valve seat, and the screw rod is passed through the gear seat and is in thread cooperation with the nut; and a lower portion of the gear seat is provided with a first position limiting portion, and an upper portion of the valve rod is provided with a second position limiting portion which is cooperated with the first position limiting portion such that the position of the valve rod relative to the gear seat is circumferentially limited and the valve rod is slidable in the axial direction.

* * * * *